UNITED STATES PATENT OFFICE.

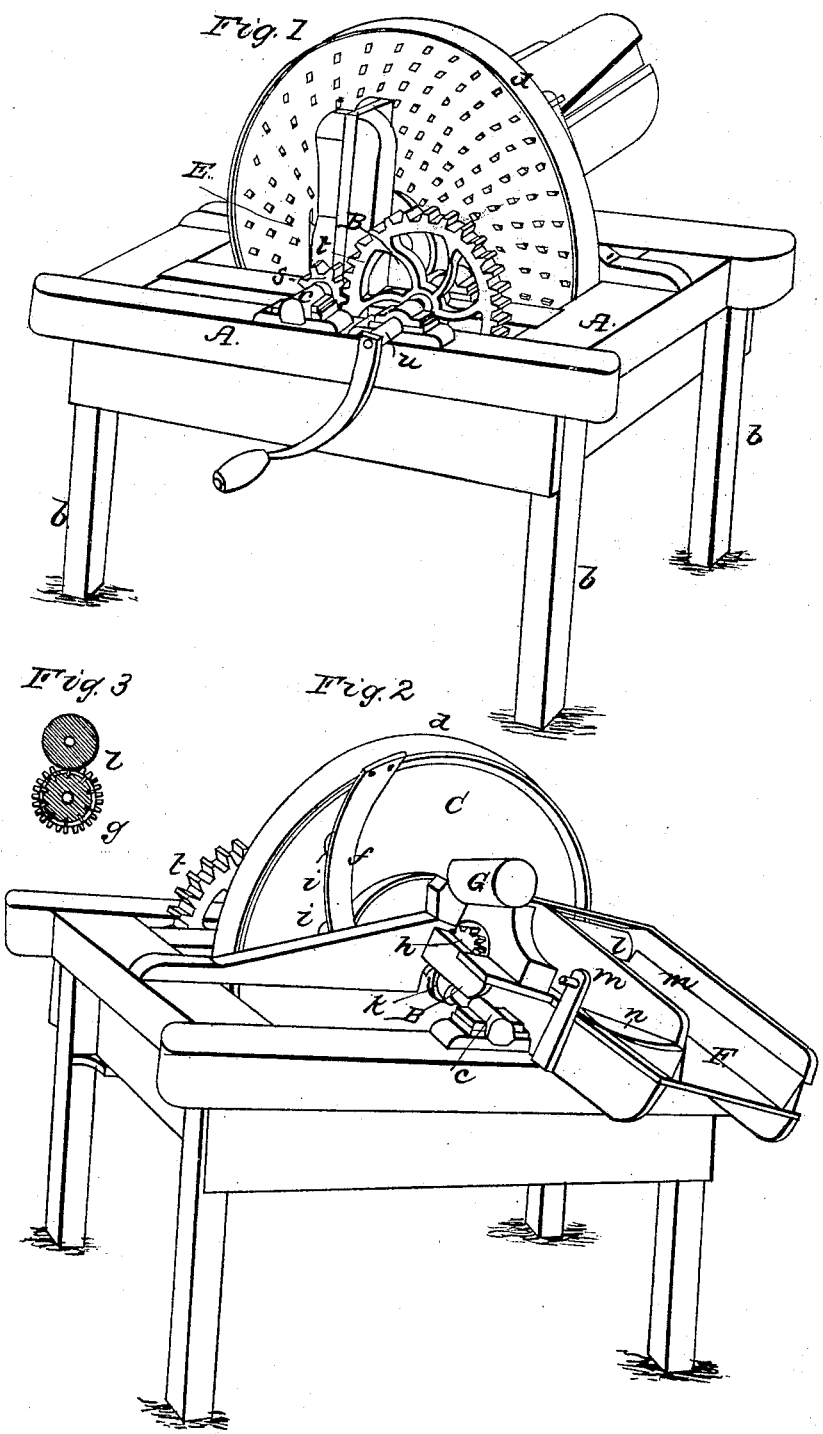

THOMAS B. JONES, OF CARLOWVILLE, ALABAMA.

IMPROVEMENT IN COB AND STALK CUTTERS.

Specification forming part of Letters Patent No. 10,110, dated October 11, 1853.

*To all whom it may concern:*

Be it known that I, THOMAS B. JONES, of Carlowville, in the county of Dallas and State of Alabama, have invented a new and useful machine to effect the three operations of cutting straw or hay, of cutting corn cobs and stalks or corn on the cob, and of shelling corn; and I do hereby declare that the following is a full, clear, and exact description of my invention, reference being had to the accompanying drawings, which form part of this specification, and in which—

Figure 1 is a view in perspective of my machine, taken in front. Fig. 2 is a similar view taken behind the machine, and Fig. 3 is a transverse section of the feed-rollers detached from the other portions of the machine.

My invention consists in the construction of a shelling and cutting wheel, in connection with the arrangement of the feed apparatus, by means of which the materials to be acted upon are subjected to the action of the wheel.

In the accompanying drawings, A is a strong frame, to which the other portions of the machine are secured, and which is supported at a convenient distance from the ground by legs $b$. This frame is crossed near its middle by a horizontal shaft B, which is supported in suitable boxes $c\ c$, and to which the shelling and cutting wheel is secured. This wheel consists of a metallic disk C, having a series of shelling-teeth $e$ cast fast to its face. The rim $d$ of the disk projects beyond the face and back, thus increasing its stiffness and furnishing a support for the knives. The latter $f$ are secured to the back of the wheel, and are curved as represented in the drawings. Their inner extremities are made fast to the hub of the wheel, which also projects beyond the face and back. Their outer extremities are made fast to the raised rim, and they are supported at suitable intervals between their two extremities by raised bosses $i\ i$, which are cast fast to the disk.

A feed-tube E is constructed at the front of the machine for the reception of the ears of corn to be shelled. A feed-trough F is secured to the back of the frame for the introduction of the straw or other similar articles. The bottom of this trough near its inner extremity is traversed by a feed-roller $g$, whose barrel is toothed or fluted to enable it to seize the straw. The gudgeon of this roller projects through its box and is fitted with a screw-wheel $h$, whose teeth engage with the threads of a screw $k$ on the shaft of the cutting and shelling wheel. A second roller $l$ is supported above the first by a frame $m$, whose side pieces are pivoted to the sides of the feed-trough and are acted upon at their hinder extremities by springs $n$, which press the barrel of the upper feed-roller upon that of the lower, thus holding the articles introduced between them firmly during the action of the cutters and at the same time enabling the lower fluted roller to seize them and move them against the disk of the cutter-wheel, which gages the length of the pieces cut by each stroke of the knives.

The feed-trough F is supported at its inner extremity by a beam $o$, which also supports an inclined feed-tube G for the presentation of corn-cobs or corn on the cob to the action of the cutters. A ring-gage $r$ is cast fast to the disk immediately opposite the inner end of this feed-tube. This gage limits the length of the piece cut by each stroke of the cutters, so as to make the pieces much shorter than the straw or stalks, as it prevents the cobs from being thrust too far beyond the inner end of the feed-tube.

The shaft B is fitted with a pinion $s$, whose teeth engage with those of a wheel $t$ on a short shaft $u$, which is supported in proper boxes on the main frame and is fitted at its outer extremity with a crank, to which power is applied to put the shelling and cutter wheel in motion.

Corn is shelled with this machine by dropping the ears into the feed-tube E at the front of the machine, where they are acted upon by the shelling-teeth protruded from the revolving wheel C. When straw or other similar substances are to be cut, they are introduced into the feed-trough F at the back of the machine, and are entered between the feed-rollers $g\ l$, by means of which they are moved forward to be acted upon by the revolving cutters $f$. Corn-cobs or similar substances are sliced by entering them in the feed-tube G and pressing them against the ring-gage $r$, which regulates the thickness of the slice removed by the cutters.

It will thus be seen that cornstalks, which, compared with the cobs or ears they produce, are very bulky, can be cut up into coarse pieces, while the cobs, which are much less bulky, but are comparatively hard, can be cut up into fine pieces by the same knife, the former being fed through the trough F and the latter through the tube G. In this way the two kinds of fodder will be mixed in due proportion, and cut up or reduced in proportion to its hardness and difficulty of mastication.

Having thus described my invention, what I claim therein as new, and desire to secure by Letters Patent, is—

The combination of the feeding-trough F, its gage-disk C, the tube G, and its gage-ring $r$ with the knives $f$, whereby the same knife will at the same time cut fodder coarse and cobs fine, and thereby improve the quality of the product as feed for animals.

In testimony whereof I have hereunto subscribed my name.

THOMAS B. JONES.

Witnesses:
JOHN S. PEAKE,
H. C. BISSELL.